US007031812B1

(12) United States Patent
Pettigrew et al.

(10) Patent No.: US 7,031,812 B1
(45) Date of Patent: Apr. 18, 2006

(54) SYSTEM AND METHOD FOR MONITORING AIRCRAFT ENGINE HEALTH AND DETERMINING ENGINE POWER AVAILABLE, AND APPLICATIONS THEREOF

(75) Inventors: James L. Pettigrew, Benbrook, TX (US); Mitchell T. Boeshart, Fort Worth, TX (US)

(73) Assignee: Howell Instruments, Inc., Fort Worth, TX (US)

( * ) Notice: Subject to any disclaimer, the term of this patent is extended or adjusted under 35 U.S.C. 154(b) by 0 days.

(21) Appl. No.: 10/799,731

(22) Filed: Mar. 15, 2004

(51) Int. Cl.
*B64D 43/00* (2006.01)
*B64D 45/00* (2006.01)

(52) U.S. Cl. .................... 701/14; 701/29; 340/945
(58) Field of Classification Search ................ 701/3, 701/14, 29, 31, 35; 340/963, 945
See application file for complete search history.

(56) References Cited

U.S. PATENT DOCUMENTS

| | | | | |
|---|---|---|---|---|
| 3,754,440 A | * | 8/1973 | Edgerton et al. | ......... 73/178 H |
| 4,467,640 A | * | 8/1984 | Morrison | .................. 73/117.3 |
| 4,736,331 A | * | 4/1988 | Lappos et al. | ................. 701/14 |
| 5,018,069 A | | 5/1991 | Pettigrew | |
| 5,050,081 A | * | 9/1991 | Abbott et al. | .................. 701/14 |
| 5,886,649 A | * | 3/1999 | Francois | ...................... 340/969 |
| 6,262,674 B1 | | 7/2001 | Wyatt | |
| 6,411,869 B1 | * | 6/2002 | Permanne | ...................... 701/3 |
| 6,469,640 B1 | * | 10/2002 | Wyatt | .......................... 340/975 |
| 2002/0016654 A1 | * | 2/2002 | Ing et al. | ...................... 701/29 |
| 2004/0254747 A1 | * | 12/2004 | Vollum | ......................... 702/50 |
| 2005/0077434 A1 | * | 4/2005 | Huynh | ....................... 244/180 |

FOREIGN PATENT DOCUMENTS

| | | |
|---|---|---|
| GB | 2179613 | 3/1987 |
| GB | 2181103 | 4/1987 |

* cited by examiner

*Primary Examiner*—Michael J. Zanelli
(74) *Attorney, Agent, or Firm*—Sterne, Kessler, Goldstein & Fox P.L.L.C.

(57) ABSTRACT

Smart instrumentation and monitoring provide primary engine instrumentation for an aircraft. The instrumentation generates real time engine power available data for the entire power regime and flight envelope of the aircraft while engine monitoring functions track, record and output performance usage data, trend data, and flight profile data. Generated data is provided to an aircraft flight manual and mission management module that automatically calculates and generates aircraft operational and performance data needed to safely operate the aircraft. The generated data is selectively displayed on flat-panel cockpit displays and/or electronic kneeboard displays in a graphical format that enhances aircrew situational awareness and permits aircrew members to operate the aircraft with its intended margin of safety.

45 Claims, 6 Drawing Sheets

SYSTEM AND METHOD FOR MONITORING AIRCRAFT ENGINE HEALTH AND DETERMINING ENGINE POWER AVAILABLE, AND APPLICATIONS THEREOF

FIELD OF THE INVENTION

The present invention relates to the field of aircraft instrumentation and condition monitoring.

BACKGROUND OF THE INVENTION

The performance and capabilities of an aircraft are dependent on the health and performance of its engine(s). For example, an aircraft's take-off distance, rate of climb, useful load, range, and endurance are determined largely by engine health and engine power available. However, despite this importance, conventional aircraft instrumentation does not allow aircrew members to accurately monitor the health of an aircraft's engine(s) and determine engine power available during flight operations.

During mission planning, aircrew members attempt to evaluate an aircraft's performance and capabilities using engine power available calculations that are contained in an operating handbook or an electronic database, which at best are based on data periodically obtained from either one single flight condition or one single high power engine run. In between these specific time interval tests, however, deterioration of the aircraft's engine(s) occurs. Thus, aircrew members must rely on inaccurate engine power available calculations, which incorrectly assume an aircraft's engine(s) can deliver rated power when in fact the engine(s) cannot deliver rated power, to evaluate an aircraft's performance and capabilities. This conventional method of attempting to evaluate an aircraft's performance and capabilities results in a reduced margin of safety during flight operations.

The task of evaluating an aircraft's performance and capabilities is particularly challenging when, for example, during flight operations an aircrew is directed to change its mission. A change in mission during flight operations requires aircraft aircrew members to re-evaluate the performance and capabilities of the aircrew in real time while concurrently trying to navigate and operate the aircraft. This leads to increased cockpit work load and aircrew stress and may result in evaluation errors that when added to the inherent inaccuracies in engine power available calculations contained in the operating handbook or electronic database used by the aircrew can cause the aircrew to unknowingly operate the aircraft in an unsafe manner.

The inaccuracies in engine power available calculations are particularly critical, for example, when evaluating a rotary wing aircraft's performance and capabilities. For example, during lifting operations or in hot, high-altitude operating environments, inaccuracies in engine power available calculations used to determine take-off and landing performance create an unacceptable safety margin that can lead to the loss of the aircraft and the aircrew.

What is presently needed is smart instrumentation that permits aircrew members to monitor engine health and accurately determine engine power available during flight operations. What is also needed is a means for automatically updating and/or generating the charts and the mission management tools used by aircrew members so they accurately reflect the performance and capabilities of the aircraft. Having smart instrumentation and accurate charts and mission management tools would permit aircrew members to operate an aircraft with its intended margin of safety in any environment.

BRIEF SUMMARY OF THE INVENTION

The present invention provides a system and method for monitoring aircraft engine health and determining engine power available during flight operations. The present invention also provides for automatically updating and generating the aircraft charts and mission management tools used by aircrew members so these charts and tools accurately reflect the aircraft's current performance and capabilities.

In an embodiment, smart instrumentation and monitoring according to the present invention provides primary engine instrumentation for an aircraft. This instrumentation generates, for example, real time engine power available data for the entire power regime and flight envelope of the aircraft while engine monitoring functions track, record and output, for example, performance usage data, trend data, and flight profile data. Generated data is provided to an aircraft flight manual and mission management module that automatically calculates and generates aircraft operational and performance data needed to safely operate the aircraft. The generated data is selectively displayed, for example, on flat-panel cockpit displays and/or electronic kneeboard displays in a graphical format that enhances aircrew situational awareness and permits aircrew members to operate the aircraft with its intended margin of safety.

In embodiments, the present invention automates calculations performed by aircrew members, thereby ensuring the accuracy of the calculations and significantly reducing aircrew cockpit workload. The automated calculations incorporate real time engine power available data generated by the smart instrumentation of the present invention. Calculations performed include, for example, operational limit calculations such as airspeed, engine power, rotor speed, and take-off and landing data torque limit calculations, and performance calculations such as, for example, engine performance, continuous power assurance, and engine torque factor/aircraft torque factor calculations. Warnings are displayed by the smart instrumentation and monitoring system of the present invention whenever selected limitations and/or valves are approached or exceeded.

In embodiments, the present invention also automates mission management functions to enhance aircrew situational awareness, flight safety, and mission effectiveness. Automated mission management functions include, for example, automated performance planning, mission planning, determination of gross weight and load lift capabilities, and the consequences of out of service equipment and instrumentation.

It is a feature of the present invention that it enhances aircrew situational awareness, flight safety, and mission effectiveness while reducing aircrew cockpit workload.

It is also a feature of the present invention that it can be implemented using redundant, modular electronics that communicate through a digital bus to each other and to multi-function flat panel displays, thereby permitting tailored designs. These tailored designs can replace or upgrade conventional instrumentation in an operating aircraft and/or be incorporated into new aircraft.

Further features and advantages of the present invention, as well as the structure and operation of various embodiments of the present invention, are described in detail below with reference to the accompanying drawings.

BRIEF DESCRIPTION OF THE DRAWINGS/FIGURES

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable persons skilled in the relevant art(s) to make and use the invention.

DETAILED DESCRIPTION OF THE INVENTION

Figure 1:
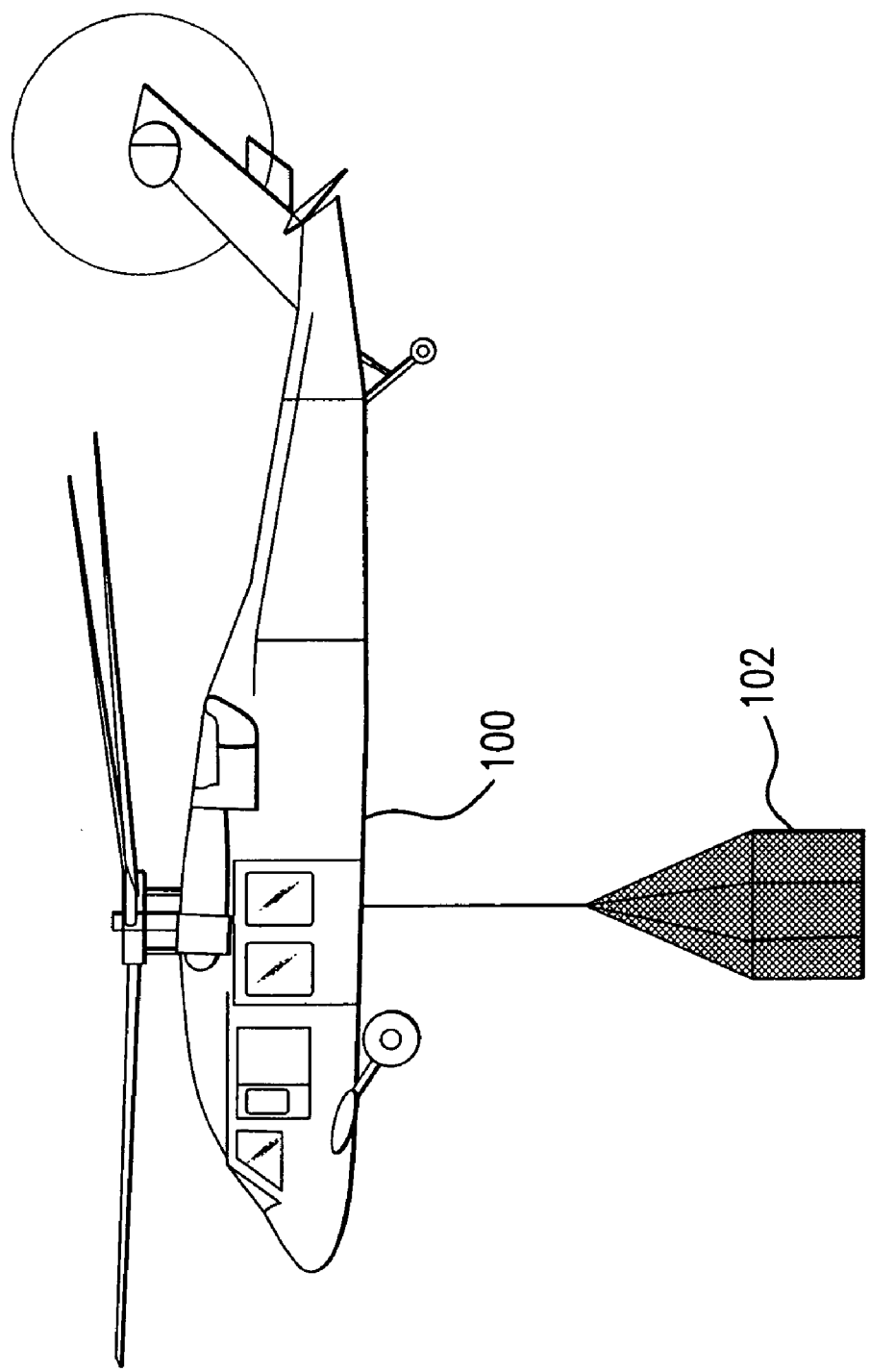
FIG. 1 is a schematic illustration of an example aircraft in which the present invention is used.

FIG. 1 is a schematic illustration of an example aircraft 100 in which the present invention is used. Aircraft 100 is a rotary wing aircraft capable of lifting and transporting an external load 102 using a hook (not shown). As would be known to persons skilled in the relevant art(s), before attempting to lift and transport external load 102, however, an aircrew member of aircraft 100 must calculate take-off and landing data to verify that lifting and transporting external load 102 is within the capabilities of aircraft 100. If the aircrew members of aircraft 100 attempt to lift and transport an external load 102 that would cause aircraft 100 to exceed its operational capabilities, it is likely that aircraft 100 would fail and could be destroyed, possibly killing all persons aboard aircraft 100.

Whether aircraft 100 can safely lift and transport external load 102 is dependent on the health of the engines of aircraft 100 and the engine power available. As described below, using the present invention, the aircrew members of aircraft 100 are able to quickly, easily, and accurately determine the health of the engines of aircraft 100 and the engine power available prior to lifting external load 102. They also are able to continually monitor the health of the engines of aircraft 100 and the engine power available while transporting external load 102 to its destination. If at any time during the lifting and transporting of external load 102 conditions should change such that the operational safety margins of aircraft 100 are reduced below an intended margin of safety, the present invention will alert the aircrew members of aircraft 100 of the change, thereby allowing the aircrew members to take action to ensure the continued safe operation of aircraft 100.

The importance of an aircrew member being able to quickly, easily, and accurately determine the health of an aircraft's engine(s) and engine power available is not limited to just the situation describe above for aircraft 100. The example of aircraft 100 lifting and transporting an external load 102 is intended only to illustrate one situation in which the utility of the present invention will be apparent to persons skilled in the relevant art(s). As would be known to persons skilled in the relevant art(s), the importance of aircrew members being able to monitor the health of an aircraft's engine(s) and accurately determine engine power available is equally applicable to all types of aircraft, including fixed wing aircraft, performing routine flight operations. For example, determining how many passengers or how much cargo can be safely carried presents similar challenges for aircrew members of both fixed wing and rotary wing aircraft.

Figure 2:
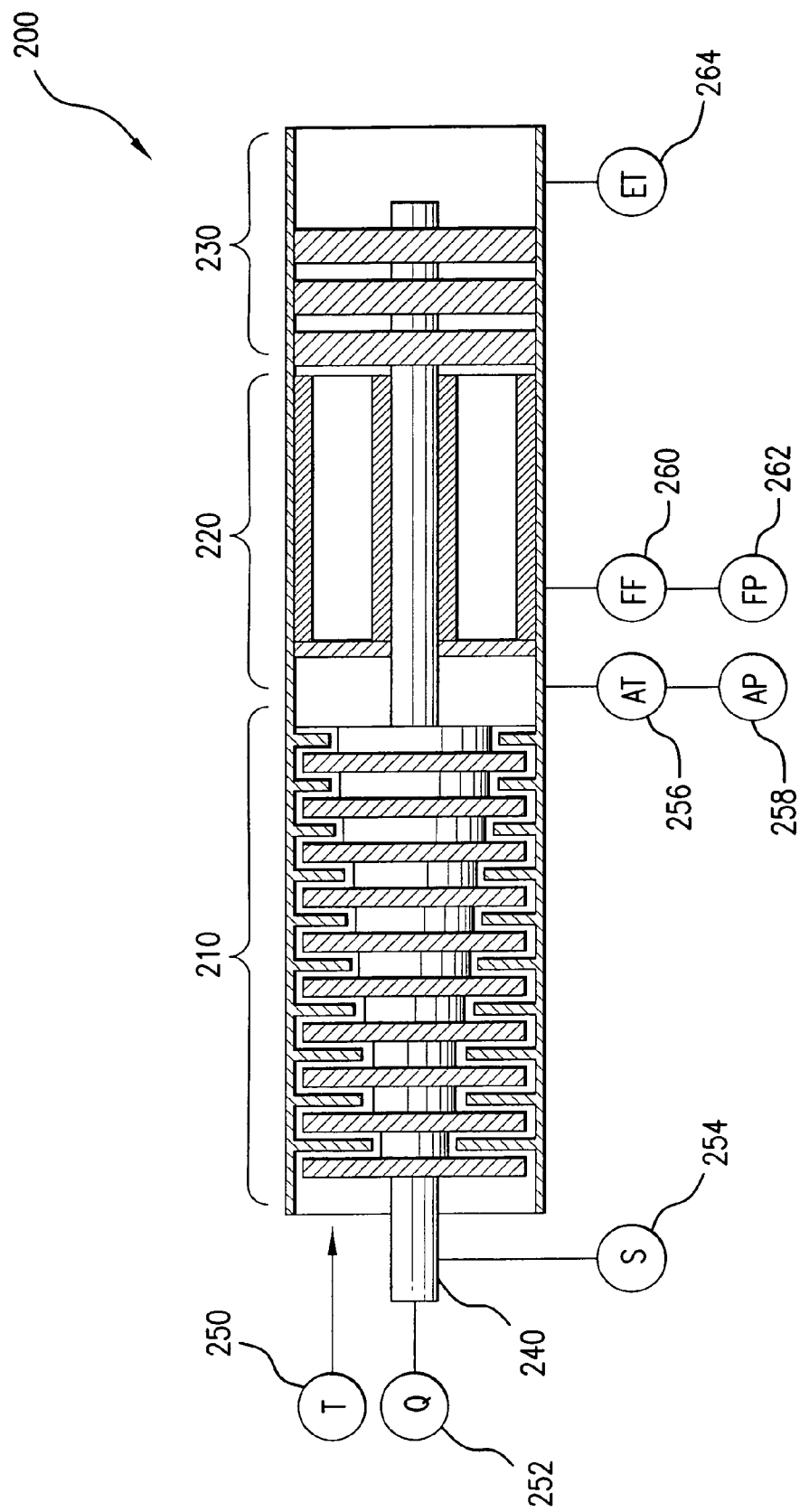
FIG. 2 is a schematic illustration of an example aircraft engine whose health and power available is monitored and determined using the present invention.

FIG. 2 is a schematic illustration of an example aircraft engine 200, whose health and power available is monitored and determined using the present invention. Aircraft engine 200 is a turboshaft engine similar in type to that used by rotary wing aircraft 100. As will become apparent based on the description herein, the present invention also can be used equally well to monitor and determine the health and power available of other aircraft engines such as, for example, a turboprop engine or a turbofan engine used to power fixed wing aircraft.

Engine 200 comprises a compressor or compressor stage 210, a combustor or combustion stage 220, and a turbine or turbine stage 230. A shaft 240 couples the compressor 210 to the turbine 230 and transfers power from engine 200 to the main and tail rotors of aircraft 100. Engine 200 is a conventional aircraft engine, which would be well known to persons skilled in the relevant art(s).

As illustrated in FIG. 2 and described herein, there are several engine performance related parameters that can be sensed and used to monitor the health of engine 200 and the power available from engine 200 in accordance with the present invention. These parameters include engine intake or ambient air temperature 250, the torque 252 of shaft 240, the rotational speed 254 of shaft 240, the discharge air temperature 256 of compressor 210, the discharge air pressure 258 of compressor 210, the fuel flow 260 to combustor 220, the fuel pressure 262 used to deliver fuel to combustor 220, and the exhaust gas temperature 264 of turbine 230.

In embodiments of the present invention, one or more of the above noted engine performance related parameters are sensed and converted to electrical signals using available aircraft instrumentation sensors. For example, conventional thermocouples can be used to sense engine intake temperature 250, the discharge air temperature 256 of compressor 210, and the exhaust gas temperature 264 of turbine 230. The output of an electrical generator, coils and/or magnetic switches coupled to shaft 240 can be used to sense the rotational speed 254 of shaft 240 and convert it into an electrical signal. Similarly, conventional pressure gauges can be used to sense the discharge air pressure 258 of compressor 210 and the fuel flow 260 to combustor 220 and convert these engine performance related parameters to electrical signals.

As further described below with references to FIG. 3 and FIG. 4, one or more of the above noted engine performance related parameters are used, alone or in combination, to calculate the health of aircraft engine 200 and its available power in real time.

Figure 3:
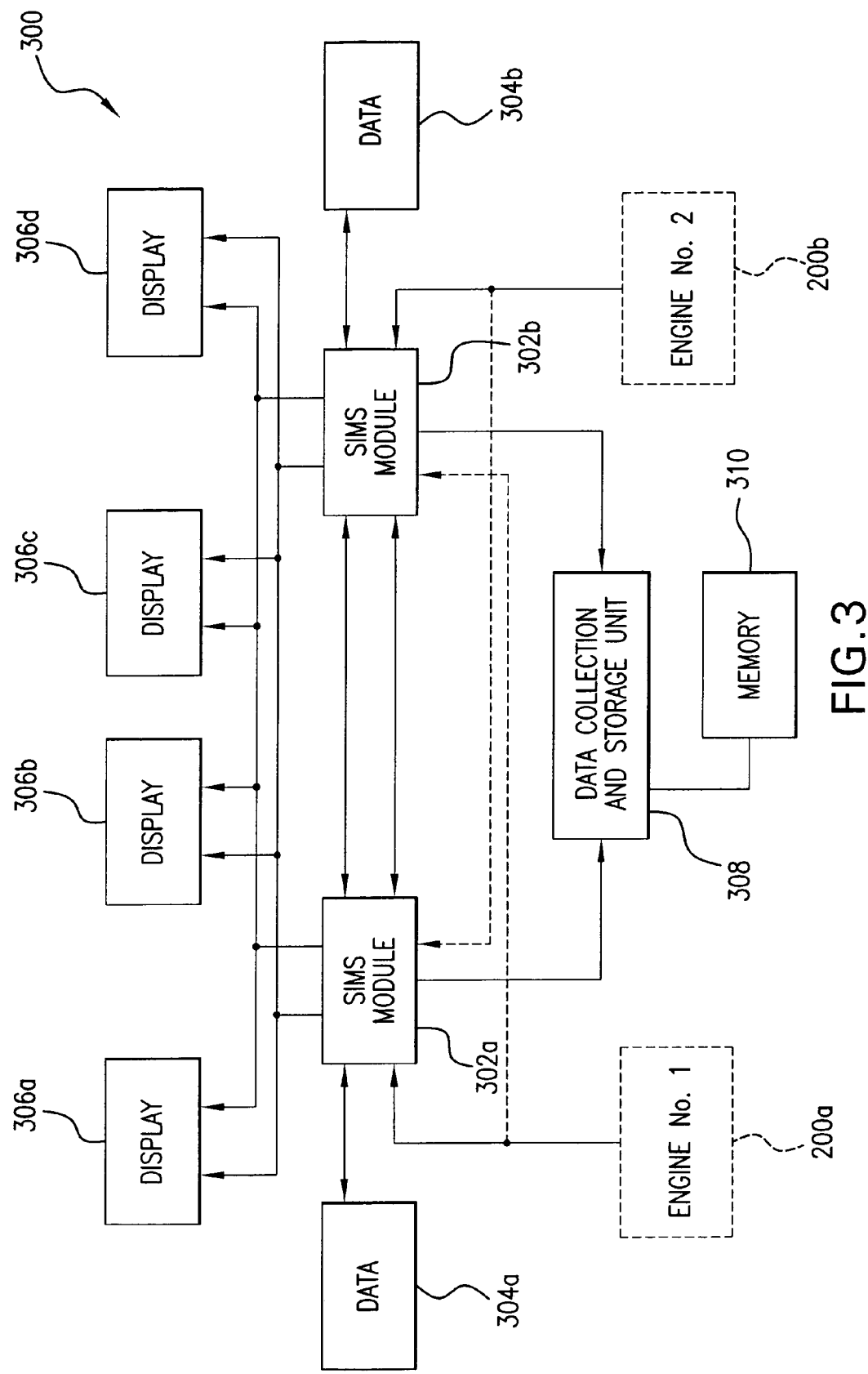
FIG. 3 is a block diagram of an aircraft instrumentation system architecture according to an embodiment of the present invention.

FIG. 3 is a block diagram of an aircraft instrumentation system architecture 300 according to an embodiment of the present invention. System architecture 300 is intended for use with aircraft having two engines. Other system architectures according to the present invention are intended for use with aircraft having more or less than two engines. These other system architectures will become apparent to persons skilled in the relevant art(s) from the description herein.

As illustrated in FIG. 3, aircraft instrumentation system architecture 300 comprises two smart instrumentation and monitoring system (SIMS) modules 302a and 302b, at least two data modules 304a and 304b, four displays 306a, 306b, 306c, and 306d, a data collection and storage unit 308 and a memory 310. System architecture 300 couples to two aircraft engines 200a and 200b. These engines are not considered a part of aircraft instrumentation system architecture 300.

Aircraft instrumentation system architecture 300 includes two SIMS modules 302a and 302b. These modules receive data from engine performance related parameter sensors (not shown) and data modules. SIMS modules 302a and 302b calculate aircraft engine health and engine power available in real time. SIMS modules 302a and 302b also optionally calculate additional target parameters related to engine power available, as described in more detail below with reference to FIG. 4. The outputs of SIMS modules 302a and 302b are displayed on one or more displays 306 and stored in a preferably crash survivable memory 310.

SIMS module 302a is coupled to one or more sensors (not shown) that are used to monitor engine performance related parameters of engine 200a. SIMS module 302b is coupled to one or more sensors (not shown) that are used to monitor engine performance related parameters of engine 200b. As indicated by the dashed lines in FIG. 3, SIMS module 302a is optionally coupled to the one or more sensors that are used to monitor engine performance related parameters of engine 200b, and SIMS module 302b is optionally coupled to the one or more sensors that are used to monitor engine performance related parameters of engine 200a. These optional connections are used for example, when desired, to provide additional redundancy. SIMS modules 302a and 302b are also coupled to each other preferably by a universal serial bus that allows the modules to communicate with one another.

As noted above, in addition to receiving inputs from engine performance related parameter sensors, SIMS modules 302a and 302b each also receive inputs from at least one data module. As shown in FIG. 3, SIMS module 302a is coupled to data module 304a. SIMS module 302b is coupled to data module 304b. In embodiments, data modules 304a and 304b can be a single data module rather than separate data modules. The types of data exchanged between a SIMS module and a data module are described further below with reference to FIG. 4.

Each SIMS modules 302a and 302b is connected to the four displays 306 by a common data bus. The common data bus is preferably used in order to eliminate wiring requirements, to save weight, and to facilitate installing instrumentation system architecture 300 in a new or existing aircraft. Displays 306 are preferably conventional multi-function displays of a type installed in commercial aircraft.

Data collection and storage unit 308 operates, for example, as a health usage and monitoring system. It receives the data output by SIMS modules 302a and 302b and stores this data in memory 310 for subsequent retrieval and analysis. As previously noted, memory 310 is preferably a crash survivable memory unit. Having the data output by SIMS module 302a and 302b automatically stored in memory 310 reduces cockpit workload by eliminating the need for aircrew members to record it. Having the data automatically stored also ensures its accuracy, which reduces the risk of engine failure through improved diagnoses of engine degradation by maintenance personnel.

The structure and operation of SIMS modules 302a and 302b, as well as the other components of aircraft instrumentation system architecture 300, will now be further described with reference to FIG. 4.

Figure 4:
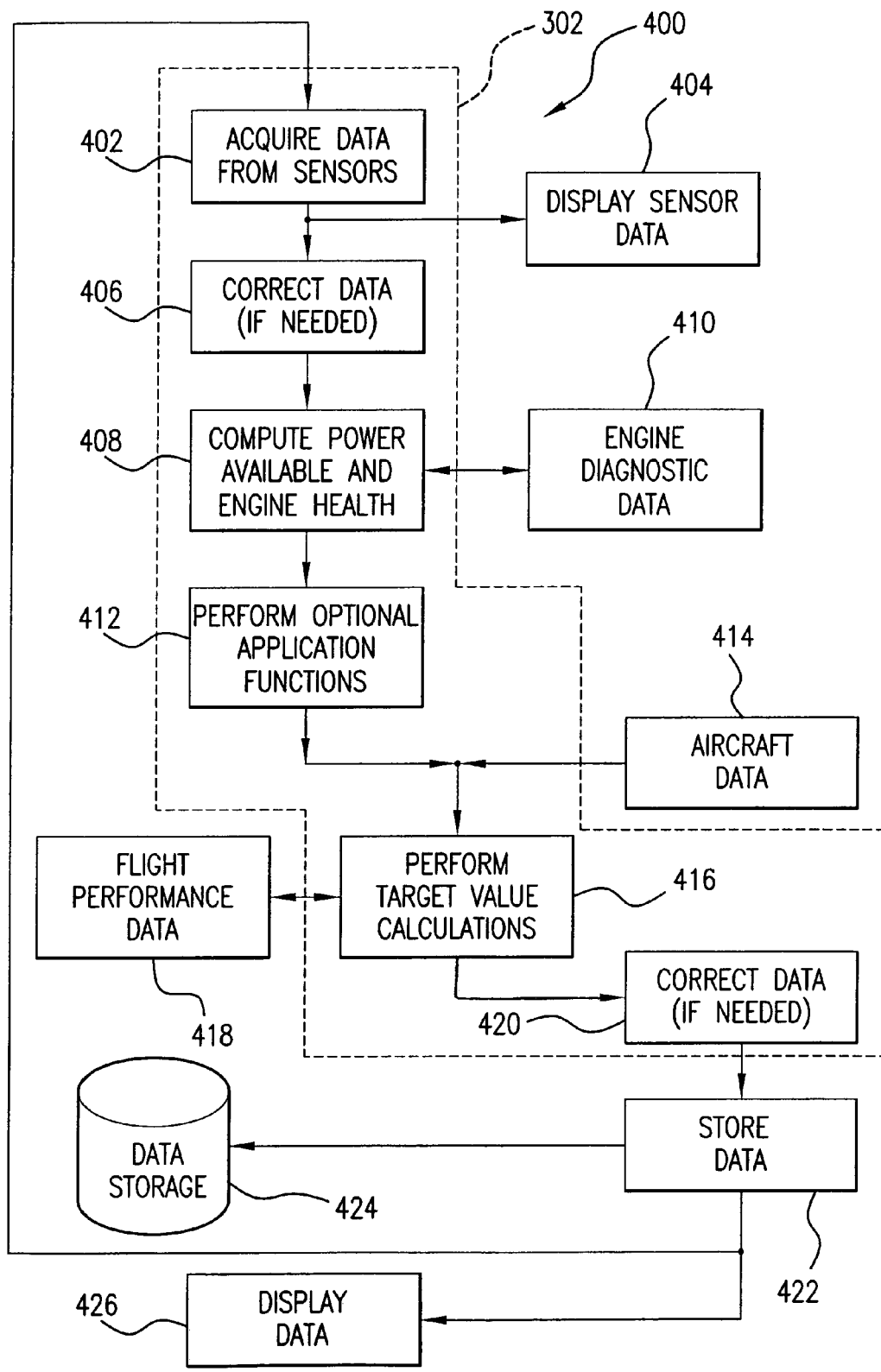
FIG. 4 is a flowchart of a method for monitoring engine health and for determining engine power available and related target parameters according to an embodiment of the present invention.

FIG. 4 is a flowchart of a method 400 for monitoring engine health and for determining engine power available according to an embodiment of the present invention. Method 400 updates and/or generates data for operational and/or performance charts and mission management tools used by aircrew members so that these charts and tools accurately reflect the aircraft's current performance and capabilities. Target calculations are performed using the updated charts and tools to generate data that is selectively displayed in a graphical format that enhances aircrew situational awareness and permits aircrew members to operate the aircraft with its intended margin of safety.

In an embodiment, as illustrated in FIG. 4, steps 402, 406, 408, 412, 416, and 420 of method 400 are performed within SIMS modules 302a and 302b. In other embodiments, one or more of these steps can be performed by modules other than a SIMS module 302. In still other embodiments, a SIMS module 302 can perform functions described herein in addition to those indicated by steps 402, 406, 408, 412, 416, and 420 of method 400.

Method 400 begins with step 402. In step 402, signals are acquired from one or more sensors including engine performance related parameter sensors. The acquired signals can be either analog signals, digital signals, or both. Examples of the types of engine performance related parameter signals that can be acquired in step 402 are noted above with reference to FIG. 2. Non-engine performance related signals also can be acquired. Non-engine related sensor signals that can be acquired include, for example, conventional aircraft sensor signals such as an airspeed sensor signal, a pressure altimeter sensor signal and/or a radar altimeter sensor signal. In embodiments, the signals acquired in step 402 are filtered and/or conditioned as a part of the acquiring step.

In embodiments of the present invention, the hardware, software, firmware or combination thereof used to implement step 402 is referred to collectively as a data acquisition module.

In step 404, one or more of the signals acquired in step 402 are displayed on a display for viewing by an aircraft aircrew member. Signals typically displayed in step 402 are signals that do not require smart processing such as, for example, an airspeed signal, an altimeter signal, and/or a temperature signal. In preferred embodiments of the present invention, these signals are displayed using a multi-function flat panel displays, which allow for tailored and/or selective displaying of the signals. In embodiments of the present invention, at least some signals acquired in step 402 are never displayed. In these embodiments, non-displayed signals, as well as displayed signals, can be stored in data storage unit 424 for subsequent retrieval and analysis by maintenance and/or engineering personnel.

In step 406, selected signals acquired in step 402 are converted or corrected, if needed. For example, selected signals may be corrected to standard conditions to facilitate their comparison to other signals (data) such as, for example, engine diagnostic data 410

In step 408, sensor signals for engine performance related parameters, acquired in step 402, are compared to engine diagnostic data 410 and engine power available data and engine health data are computed. How to combine engine performance related parameter sensor signals and compare them to referred engine diagnostic data to determine the health and power available from an engine is known to persons skilled in the relevant art(s). Referred engine diagnostic data values are a measure of the deviation between accepted engine parameter curves representing the functional relationships between various turbine engine performance parameters and actual engine parameter curves. See, for example, U.S. Pat. No. 5,018,069, issued May 21, 1991 to James L. Pettigrew, which is incorporated herein by reference in its entirety. U.S. Pat. No. 5,018,069 also teaches and describes how to generate the data referred to herein as engine diagnostic data 410.

In embodiments of the present invention, the hardware, software, firmware or combination thereof used to implement step 408 is referred to collectively as an engine performance monitoring module.

In step 412, optional application functions are performed on the data calculated in step 408 and/or on the signals acquired in step 402. The types of optional application functions that can be performed in step 412 are application specific and nearly limitless. For example, one function that can be performed is data averaging. Other functions that might be performed in step 412 include, but are not limited to, data weighting, data biasing, data time-shifting, and/or data checking.

In step 416, data from step 412 is combined with aircraft data 414 and flight performance data 418 to produce target value data or target values. The target value data produced can include any data required for operation of an aircraft such as, for example, engine monitoring data, aircraft operational data, aircraft performance data and/or mission management data. In embodiments, operational data produced in step 416 includes, but is not limited to, exceedance and limit monitoring data relating to, for example, engine power, airspeed, rotor speed, and/or take-off and landing torque. In embodiments, performance data produced in step 416 includes, but is not limited to, data relating to engine performance, torque factor, and continuous power assurance checks. Mission management data produced in step 416 in embodiments of the present invention includes, but is not limited to, performance planning data, mission planning data, gross weight data, load/lift capability data, and mission profile data. Additional data that can be generated in step 416 will become apparent to persons skilled in the relevant art(s) given the description herein.

In embodiments, hazard warnings are generated in step 416 based on predictions, for example, that one or more limitation values will be exceeded. These predictions are made using real time sensor signal values acquired in step 402 and a determined rate of change of selected sensor signals. These warnings are displayed in step 426, thereby allowing aircrew members to take corrective actions.

In embodiments of the present invention, the hardware, software, firmware or combination thereof used to implement step 416 is referred to collectively as a target value computation module.

Aircraft data 414 is data specific to a particular aircraft. The data includes, for example, gross weight, drag plate, and limit setting data, et cetera. This data is available from an aircraft's log book, placards, and/or operating and flight manuals.

Flight performance data 418 is data typically found in an aircraft's operating and flight manuals and/or on performance planning cards. This information is stored and retrieved digitally. In preferred embodiments, flight performance data 418 is a part of a software program running on an electronic kneeboard or on a personal computing device.

In these embodiments, the program implementing step 416 can pass data to the software program running on the electronic kneeboard or personal computing device, which retrieves and/or calculates the needed data and returns it to the program implementing step 416. In these embodiment, the software program running on the electronic kneeboard or personal computing device is periodically updated by data passed to it from the program implementing step 416 (e.g., the current engine power available data) so that data 418 remains current and accurate. Persons skilled the relevant art(s) will understand how to implement flight performance data 418 as a part of a software program.

In step 420, data from step 416 is corrected, for example, back to current conditions from standard conditions, if needed, so that it can be displayed and/or stored.

In step 422, selected data is stored in a memory 424. The stored data can be subsequently retrieved by engineering and/or maintenance personnel and used for identifying and diagnosing purposes, trending purposes, performance/usage purposes.

In embodiments of the present invention, the hardware, software, firmware or combination thereof used to implement step 422 is referred to collectively as a data storage module.

In step 426, smart data generated by method 400 is displayed on a display. In preferred embodiments, the smart data is displayed on flat-panel cockpit displays and/or electronic kneeboard displays for viewing by an aircrew member.

As shown in FIG. 4, the above steps are repeated in a loop at a selected rate. In preferred embodiments, this rate is on the order of a minute, a second, or some fraction of a second to produce real time data.

As described herein, the present invention is intended to be used to generate and display three general categories of data that both increase flight safety and reduce cockpit workload. These categories are engine monitoring data, mission management data, and flight performance data. Examples of each these three categories of data and how to display them are illustrated in FIG. 5 and FIG. 6.

Figure 5:
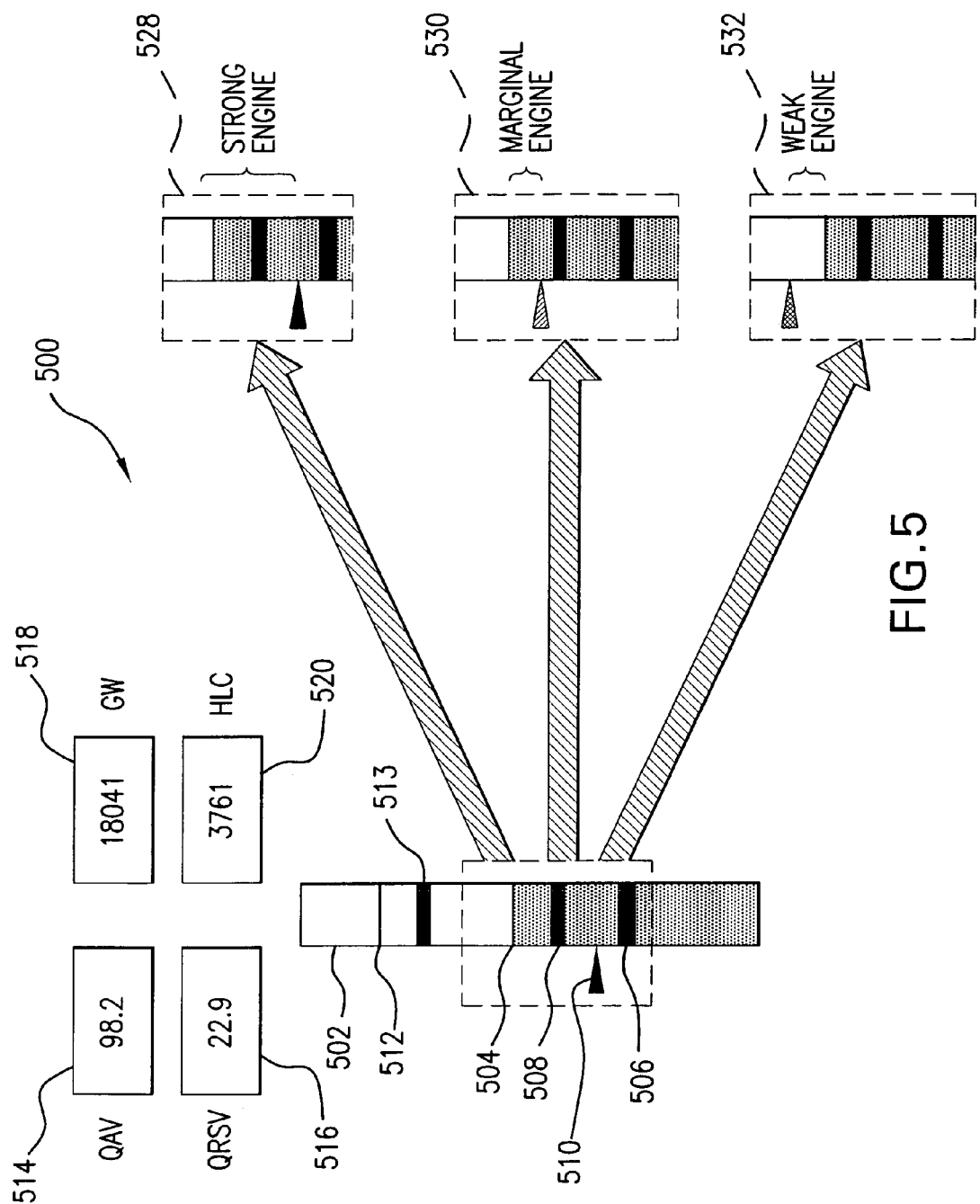
FIG. 5 is a schematic illustration of a first example set of data generated and displayed by the present invention.
Figure 6:
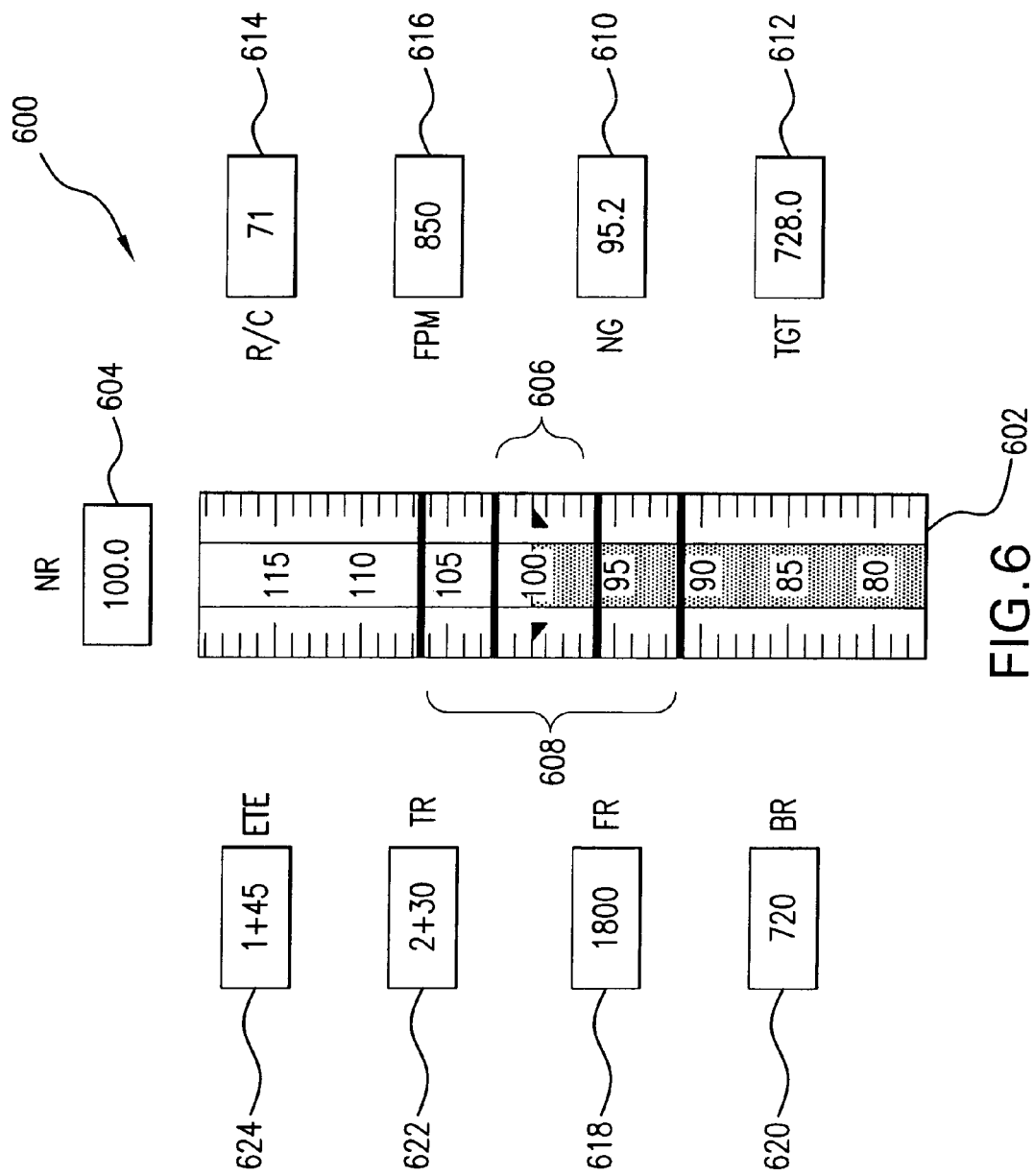
FIG. 6 is a schematic illustration of a second example set of data generated and displayed by the present invention.

FIG. 5 is a schematic illustration of a first example set of data 500 generated by the present invention and displayed on a display for viewing by an aircrew member of a rotary wing aircraft 100. The specific data 500, its form, and its placement in FIG. 5, however, are not intended to limit the present invention. As described herein, in preferred embodiments, the data 500 is displayed on multi-function flat panel displays that allow for different and varying placement of the data on the displays. The specific data 500 and its form can be tailored to accommodate individual user needs.

On the right hand side of FIG. 5, a torque bar graph 502 is shown. The height of the bar 504 indicates the real time torque being generated by a single engine such as, for example, engine 200. A line 512 near the top of torque bar graph 502 represent the available torque for the engine. The line 513, just below line 512, indicates a calculated exceedance condition for the engine. Typically, one torque bar graph 502 would be displayed for each engine of an aircraft.

In a first display mode, the line 506 represents the calculated torque required to hover the aircraft in ground effect, and the line 508 indicates the calculated torque required to hover the aircraft out of ground effect. In a second display mode, the line 506 represents the calculated torque required to achieve maximum range of the aircraft, and the line 508 indicates the calculated torque required to achieve maximum endurance of the aircraft.

The caret 510, next to the bar graph 502, illustrates the current health of the engine. In embodiments, both the color of caret 510 and the position of caret 510 relative to bar graph 502 is used as an indication of engine health. This is shown in the callouts 528, 530, and 532.

Callout 528 represents a picture of health for a strong engine. The caret is solid (e.g., green in color) indicating at a glance that the engine's health is strong. The caret is also well below the top of the bar indicating real time engine torque, thereby giving a more quantitative indication of the degree of good health.

Callout 530 represents a picture of health for a marginal engine. The caret is double hashed (e.g., yellow in color) indicating at a glance the marginal health of the engine. The caret is also nearer the top of the bar indicating real time engine torque, thereby giving a more quantitative indication of the degree of marginal health.

Callout 532 represent a picture of health for a weak engine. The caret is hashed (e.g., red in color) indicating at a glance a weak engine. The caret is above the top of the bar indicating real time engine torque, thereby giving a more quantitative indication of the degree of weakness of the engine.

The four numeric indications above bar graph 502 represent calculated smart data, which is displayed, for example, during step 426 of method 400. In embodiments, this smart data includes both performance data and mission data. This data need not be displayed near bar graph 502, as depicted in FIG. 5.

Data 514 is a numerical indication of the torque available (QAV) from the engine. Data 514 is displayed as a percentage of rated torque. In FIG. 5, data 514 corresponds to line 512. In a multi-engine aircraft, data 514 can display, for example, the torque available from a selected engine, an average torque available, or a percentage of the rated torque available for all engines.

Data 516 is a numerical indication of torque reserve (QRSV). The torque reserve data 516 allows a pilot to determine at a glance how much additional torque can be derived if needed. Data 516 is displayed as a percentage of rated torque. As with data 514, in a multi-engine aircraft, data 516 can display, for example, the torque reserve for a selected engine, an average torque reserve, or the torque reserve available from all engines as a percentage of rated torque available for all engines.

Data 518 is a numerical indication of the gross weight (GW) of the aircraft. The gross weight is dynamically updated, for example, to account for changes in weight due to fuel burn or the addition of fuel to the fuel tanks. In an embodiment, data 518 is displayed in pounds.

Data 520 is a numerical indication of hook lift capacity (HLC). Data 520 is dynamically updated to allow a pilot to quickly determine whether lifting a particular weight is within the present capabilities of the aircraft. In an embodiment, data 520 is displayed in pounds.

FIG. 6 is a schematic illustration of a second example set of data 600 generated by the present invention and displayed for viewing by an aircrew member of a rotary wing aircraft. The numeric data 600 includes smart data and sensor data. The smart data is displayed, for example, during step 426 of method 400. The sensor data is displayed, for example, during step 404 of method 400. The example data 600 can be displayed together with or separately from the data 500 shown in FIG. 5. As with the data 500 in FIG. 5, the specific data 600 in FIG. 6, its form, and its placement in FIG. 6 is not intended to limit the present invention. The specific data 600 and its form can be tailored to accommodate individual user needs.

In the center of FIG. 6, a rotor head speed indicating bar graph 602 is shown. Bar graph 602 indicates both graphically and numerically rotor head speed in percent revolutions per minute rated (RPM-R). Data 604, above bar graph 602, is a numerical representation of rotor head speed displayed in percent RPM-R. The region 606 of bar graph 602 is bounded by a top transient condition line and a bottom transient condition line. In a preferred embodiment, these transient condition lines are yellow lines. The region 608 of bar graph 602 is bounded by a top exceedance condition line and a bottom exceedance condition line. In a preferred embodiment, these exceedance condition lines are red lines. As described above, in method 400, these transient and exceedance values are calculated in step 416.

The numeric indications 610 and 612 represent sensor data, which is displayed, for example, in step 404 of method 400. Data 610 is the speed of the gas turbine generator (NG). Data 612 is the turbine gas temperature (TGT). The data 610 and 612 are specific to a particular engine. Thus, in a multi-engine aircraft, more than one set of data 610 and 612 are shown, or the data 610 and 612 are selectively set to display data for a particular engine of interest.

The numeric data 614 and 616 represents smart data, which is displayed, for example, in step 426 of method 400. Data 614 is the airspeed for best rate of climb (R/C) of the aircraft. The data 616 is the calculated rate of climb in feet per minute (FPM) that the helicopter will achieve if flying at the indicated best rate of climb. The data 616 can be, for example, the rate of climb achievable using all engines, or alternatively it can be the rate of climb contribution of a particular/selected engine. In this later case, the displayed data represents a prediction of aircraft performance assuming a loss of one or more engines.

Data 618 is the calculated fuel remaining (FR), for example, in pounds. In embodiments, data 618 is dynamically updated to account for fuel burned or the addition of fuel to the fuel tanks during a refueling.

Data 620 is the rate at which fuel is being burned or fuel burn rate (BR), for example, in pounds per hour. In embodiments, data 620 is dynamically updated to indicate the real time fuel burn rate of the aircraft.

Data 622 is the calculated flight time remaining (TR) based on the fuel remaining (data 618) and the fuel burn rate (data 620). In embodiments, data 622 is dynamically updated to account for changing fuel burn rate.

Data 624 is an estimated time enroute (ETE). Data 624 is typically determined during mission planning by an aircrew member. In an embodiment, data 624 is manually programmed or entered into the multi-function display so that it can be compared to flight time remaining data 622 by a member of the flight crew and a determination made at a glance whether there is sufficient flight time remaining to complete a mission.

As noted above, the data shown in FIG. 5 and FIG. 6 serve only to illustrate the type of engine monitoring, mission management, and performance data that can be generated and displayed by embodiments of the present invention. The data shown and described is not an exhaustive listing of all of the data that can be generated and displayed in accordance with the present invention. In other embodiments, data different from that shown in FIG. 5 and FIG. 6 is generated and displayed. Such data includes, for example, predicted aircraft performance data in case of a lost engine for a multi-engine aircraft and/or calculated landing performance data for landing at a distant landing site, wherein the landing performance is based on a predicted air temperature and a predicted air pressure at the landing site and the estimated time enroute to the landing site. Still other data is generated and displayed in other embodiments of the present invention. Given the description herein, persons skilled in the relevant art(s) will understand how to implement and use the present invention to generate and display a wide variety of additional engine monitoring, mission management, and performance data that is within the breadth and scope of the present invention.

Example embodiments of the of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A system for generating and displaying engine performance data for an operating aircraft, comprising:
    a data acquisition module that acquires sensor data from a sensor that monitors an engine performance related parameter;
    an engine performance monitoring module, coupled to the data acquisition module, that compares sensor data acquired by the data acquisition module to referred engine diagnostic data and computes engine power available data and engine health data; and
    a display located in the aircraft, coupled to the engine performance module, that displays engine power available data and engine health data computed by the engine performance monitoring module.

2. The system of claim 1, further comprising:
    a target value computation module, coupled between the engine performance monitoring module and the display, that calculates at least one target value using data received from the engine performance monitoring module.

3. The system of claim 2, wherein the at least one target value is a thrust.

4. The system of claim 2, wherein the at least one target value is a torque.

5. The system of claim 2, wherein the at least one target value is a value required for maximum range of the aircraft.

6. The system of claim 2, wherein the at least one target value is a value required for maximum endurance of the aircraft.

7. The system of claim 2, wherein the at least one target value is a value for best rate of climb of the aircraft.

8. The system of claim 2, wherein the at least one target value is a value required to hover the aircraft in ground effect.

9. The system of claim 2, wherein the at least one target value is a value required to hover the aircraft out of ground effect.

10. The system of claim 2, wherein the at least one target value is displayed graphically on the display.

11. The system of claim 1, wherein the engine health data is indicated on the display by a caret.

12. The system of claim 11, wherein a color of the caret provides an indication of engine health.

13. The system of claim 11, wherein a position of the caret relative to an indicating bar provides an indication of engine health.

14. The system of claim 2, wherein the at least one target value is a limiting condition for the aircraft.

15. The system of claim 14, wherein the limiting condition is an exceedance value.

16. The system of claim 14, wherein the limiting condition is an engine turbine speed.

17. The system of claim 14, wherein the limiting condition is a rotor speed.

18. The system of claim 14, wherein the limiting condition is a turbine gas temperature.

19. The system of claim 14, further comprising:
    displaying a warning on the display if the limiting condition is exceeded.

20. The system of claim 19, wherein the warning relates to an impending loss of rotor speed.

21. The system of claim 1, wherein the displayed engine power available data is the power available from more than one engine.

22. The system of claim 1, wherein the displayed engine power available data is the power available following a loss of one engine.

23. The system of claim 1, wherein the displayed engine power available data is recomputed at least once a minute to account for changing ambient conditions.

24. The system of claim 1, wherein the displayed engine power available data is recomputed at least once a second to account for changing ambient conditions.

25. The system of claim 1, further comprising:
    a data storage module, coupled between the engine performance monitoring module and the display, that stores received data in a memory.

26. A method for generating and displaying engine performance data for an operating aircraft, comprising:
    (1) acquiring data from a sensor that monitors an engine performance related parameter;
    (2) comparing sensor data acquired in step (1) to referred engine diagnostic data;
    (3) computing engine power available data and engine health data based on a result of the comparison performed in step (2); and
    (4) displaying the engine power available data and the engine health data computed in step (3) on a display located in the aircraft.

27. The method of claim 26, further comprising:
    (5) calculating at least one target value based on the engine power available data computed in step (3).

28. The method of claim 27, wherein step (5) comprises computing an exceedance value.

29. The method of claim 27, wherein step (5) comprises computing a torque value.

30. The method of claim 27, wherein step (5) comprises computing a thrust value.

31. The method of claim 27, wherein step (5) comprises calculating a target value required for maximum range of the aircraft.

32. The method of claim 27, wherein step (5) comprises calculating a target value required for maximum endurance of the aircraft.

33. The method of claim 27, wherein step (5) comprises calculating a target value required for best rate of climb of the aircraft.

34. The method of claim 27, wherein step (5) comprises calculating a target value required to hover the aircraft in ground effect.

35. The method of claim 27, wherein step (5) comprises calculating a target value required to hover the aircraft out of ground effect.

36. The method of claim 27, wherein step (5) comprises calculating a limiting condition for the aircraft.

37. The method of claim 36, wherein step (5) comprises calculating a limiting turbine speed.

38. The method of claim 36, wherein step (5) comprises calculating a limiting turbine gas temperature.

39. The method of claim 36, wherein step (5) comprises calculating a limiting rotor speed.

40. The method of claim 36, further comprising:
(6) indicating, on the display, a warning if the limiting condition calculated in step (5) is exceeded.

41. The method of claim 40, wherein step (6) comprising: indicating a warning of impending loss of rotor speed.

42. The method of claim 26, wherein step (4) comprises displaying the engine health data by a caret on the display.

43. The method of claim 40, further comprising:
(7) repeating steps (1) through (6) at least once a minute to account for changing ambient conditions.

44. The method of claim 40, further comprising:
(7) repeating steps (1) through (6) at least once a second to account for changing ambient conditions.

45. The method of claim 26, further comprising:
(5) storing engine power available data and engine health data computed in step (3) in a memory.

* * * * *

UNITED STATES PATENT AND TRADEMARK OFFICE
CERTIFICATE OF CORRECTION

| | | |
|---|---|---|
| PATENT NO. | : 7,031,812 B1 | Page 1 of 1 |
| APPLICATION NO. | : 10/799731 | |
| DATED | : April 18, 2006 | |
| INVENTOR(S) | : Pettigrew et al. | |

It is certified that error appears in the above-identified patent and that said Letters Patent is hereby corrected as shown below:

column 14, line 1, "comprising:" is replaced by -- comprises --.

Signed and Sealed this

Twenty-ninth Day of August, 2006

JON W. DUDAS
*Director of the United States Patent and Trademark Office*